(12) United States Patent
Tsai et al.

(10) Patent No.: US 6,197,709 B1
(45) Date of Patent: Mar. 6, 2001

(54) MELTBLOWN COMPOSITES AND USES THEREOF

(75) Inventors: Peter Ping-Yi Tsai; Charles B. Hassenboehler; Larry C. Wadsworth, all of Knoxville; Gretta Heismeyer, Lenoir City, all of TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/175,243

(22) Filed: Oct. 20, 1998

Related U.S. Application Data

(60) Provisional application No. 60/040,231, filed on Mar. 11, 1997.

(51) Int. Cl.[7] .................................................. D04H 1/56
(52) U.S. Cl. ........................... 442/347; 442/344; 442/400; 428/212; 428/218
(58) Field of Search ................................. 442/344, 347, 442/400; 428/212, 218

(56) References Cited

U.S. PATENT DOCUMENTS

| 5,350,620 |   | 9/1994  | Sundet et al.    |         |
|-----------|---|---------|------------------|---------|
| 5,609,947 |   | 3/1997  | Kamei et al.     |         |
| 5,620,785 | * | 4/1997  | Watt et al.      | 428/219 |
| 5,679,042 |   | 10/1997 | Varona           |         |
| 5,804,512 | * | 9/1998  | Lickfield et al. | 442/346 |

* cited by examiner

*Primary Examiner*—Terrel Morris
*Assistant Examiner*—Ula C. Ruddock
(74) *Attorney, Agent, or Firm*—Duane, Morris & Heckscher LLP

(57) ABSTRACT

This invention is directed towards a porous composite having an inlet face and an exit face and further comprises intermingled meltblown fibers and staple fibers which define a density gradient from coarse pores at the inlet face to fine pores at the exit face.

13 Claims, 5 Drawing Sheets

MELTBLOWN COMPOSITES AND USES THEREOF

RELATED CASES

This nonprovisional U.S. national application, filed under 35 U.S.C. §111(a), claims, under 35 U.S.C. §119(e)(1), the benefit of the filing date of provisional U.S. national application No. 60/040,231, filed under 35 U.S.C. §111(b) on Mar. 11, 1997 the teachings of which are incorporated herein by reference.

FIELD OF THE INVENTION

The present invention relates to novel melt blown (MB) composites in which staple fibers such as polypropylene, polyethylene, polyesters, nylons, cotton, wool, glass fibers and/or particulate materials including activated carbon, superabsorbent powders and fibers, and shredded textile materials are thoroughly intermingled with MB fibers in the MB composite web in a controllable manner such that a desired density gradient across the composite web is achieved. The invention also relates to such composites which are preferably cold electrostatically charged, to the process of so charging, to a method of using the composite, and a process for making the composite.

BACKGROUND OF THE INVENTION

Melt blown (MB) nonwovens are used for air filters because their ultra fine fibers provide large surface area. However, their high packing density results in high air resistance and only surface filtration is available for most particle sizes. This largely restricts their application to one-time use disposable respirators, surgical face masks and operating room fabrics.

The invention contributes to solving the shortcomings of the prior art.

SUMMARY OF THE INVENTION

This invention provides high-porous MB composites with controllable density across the thickness of the filter by embedding staple fibers into the melt blowing fiber stream. These composites have bulk and low pressure drop—hence their particle holding capacity and service life are increased without reducing the filtration efficiency. Furthermore, the filtration efficiency may be enhanced even more appreciably by electrostatically charging the composites.

BRIEF DESCRIPTION OF THE INVENTION

Figure 1A:
FIG. 1A is a scanning electron microscope (SEM) photograph (500×magnification) of a melt blown web.

The invention relates to composite webs comprising meltblowage fibers intermingled with staple fibers which increase bulk and reduce density. The composite has a density gradient which is highest in the proximity of one side of the composite and lowest in the proximity of the other side of the composite with a gradient between the two surfaces.

A key aspect of this invention is that the concentration of injected fibers (blend ratio of injected fibers to MB fibers) can be controlled to vary as desired across the thickness of the composite web. Generally, it is more desirable for a filter to have different degrees of filtration across the thickness of the filter or filter assembly. For example, a depth filter may have the coarser, more open side facing the challenging aerosol (or liquid to be filtered) so that the larger particulate is trapped in the larger pores and openings in the webs, where there is more space to hold these large particles, without notably restricting air (or liquid) flow through the filter and thereby increase the pressure drop. The aerosol containing the finer particles then travels through the more dense side of the filter where there are more of the very fine MB fibers to capture the particulate on the greater fiber surface area. Since most of the larger particulate has been removed in the less dense side of the filter, it will require more time for particulate matter to close up the pores on the dense side. Thus, a filter with a gradient going in the direction of coarse (less dense) to finer (more dense) can filter an aerosol containing a mixture of coarse and fine particulate, and still filter the very fine particulate matter to an extremely high degree of efficiency with accompanying low pressure drop and high filter life. The aerosol may be any type of gas and liquid may be water and other liquid.

Furthermore, a filter with a density gradient going from coarse (less dense) to finer (more dense) can also filter an aerosol of mostly very fine particles with excellent filtration efficiency and greater filter life because there is more free space on the more porous side to hold particulate that would otherwise have a tendency to cake the side of the filter where the aerosol is introduced.

DETAILED DESCRIPTION OF THE PREFERRED EMBODIMENTS

Hassenboehler (1994) has described the MB process and the advantage of MB webs used for filters. The filtration efficiencies (FE) of a control and of MB webs electrostatically charged by corona discharge have been described by Tsai and Wadsworth (1994a). The high FE of MB webs comes from their ultra fine fibers. The MB fibers in filtration grade MB webs range from 0.5 to 10 micrometers, with the average fiber diameter typically ranging from 2–4 micrometers. Although the patents and publications on the subject of melt blowing which date back more than 10 years state that MB filters are broken during the MB process resulting in lengths of only a few centimeters, recent studies have shown that the MB fibers are predominately continuous (Milligan and Utsman, 1995x: Milligan, M. W. and Utsman, F. "An investigation of the Meltblown Web Defect known as Shot," *International Nonwovens Research Journal* 7 No. 2, 65–68, 1995; Milligan et al., 1992y: Milligan, M. W., Lu, F., Buntin, R. R. and Wadsworth, L. C., "The Use of Crossflow to Improve Nonwoven Melt-Blown Fibers," *Journal of Applied Polymer Science* 44, 279–288, 1992). In any respect, it would be virtually impossible to determine from the webs the actual lengths (even if the filaments were broken) of MB fibers due to the extensive fiber entanglements, which are inherent with the MB process.

However, the very fine fibers also contribute to a high air resistance, which is registered as a high pressure drop through the web if the packing density of the web is not reduced in some way. The pressure drop of a MB web can be reduced by increasing the distance (DCD) between the die and the collector or by increasing the fiber size by changing the processing conditions. It has been shown (Wadsworth, 1990) that the FE of MB media decreases by increasing the DCD in order to make bulkier webs. This results in less uniform lay down of the MB fibers on the collector and also allows more filaments to twist together. This bulkier, less uniform web has larger pores, and consequently, lower pressure drop, but lower FE.

Since increasing DCD or fiber size is not a good technique to reduce the air resistance through the web, this invention enables a reduction of pressure drop and an increase in particle holding capacity without adversely affecting the FE of MB webs by blending into the MB fiber stream staple fibers such as polypropylene (PP), polyethylene (PE), polyesters, nylons, cotton, wool, glass fibers and/or particulate materials including activated carbon, superabsorbent powders and fibers and shredded textile materials. The diameters of the staple fibers, which vary in cross sectional shape from flat (cotton fiber has a flat twisted ribbon-like shape) to round (with the synthetic fibers almost any type of cross sectional shape may be achieved by varying the shape of the spinneret hole) generally range from 12 to 60 micrometers and their lengths range from 0.5 to 3.0 inches (synthetic staple fibers are usually cut from continuous filaments to lengths of 1–2 inches). Wool fibers vary greatly in length and tend to be much longer, ranging up to 2–6 inches in length. Shredded textiles will vary in thickness, length and width according to the shredding conditions, but the longest dimensions of a particular shredded textile particle may range from 1/6 to 1/2 inch. Activated carbon particles and superabsorbent particles could vary from diameters of 1 to 300 micrometers.

The MB fibers may be any meltblowable, generally synthetic fibers. The fibers may be single or bicomponent fibers of polyolefins, polypropylene (PP), polyethylene (PE), polyamides (nylon 6, nylon 6,6, etc.), polyesters, polyethylene terephthalate (PET), polycyclohexhane terephthalate (PCT), polybutylene terephthalate (PBT), polytrimethylene terephthalate (PTT) or any MB fiber or mixture of MB fibers that can be melt blown. For the composites of this invention which are to be electrostatically charged for enhanced FE, Wadsworth and Tsai (1997x: Wadsworth, L. C. and Tsai, P. P., 1997, "Recent advances and applications for Electrostatically Charged Filters," Proceedings of Second International Conference on Nonwovens in Filtration, Stuttgart, Germany, 80–85, March 18–19), have shown that PP, PE, and PCT polyesters can be more readily charged to give higher FE and much greater durability of FE after corona charging. Nevertheless, any type of MB fibers that can be electrostatically charged is suitable. It has been shown that if the MB fibers can be electrostatically charged, it is not necessary for the injected fibers to be electrostatically charged to obtain good FE (Wadsworth and Tsai, 1997x).

The nature of the meltblown fiber material is not critical in that any material which is capable of meltblown fiber forming will be suitable for practice of this invention. Likewise, the nature of the staple fiber material is not critical and any material which is capable of being thoroughly intermingled with a meltblown fiber to define a density gradient in the resulting composite will be suitable.

For all further discussions of this invention in this invention, the term "staple fibers," unless referring to specific staple fibers or textile materials such as PP staple fibers shall imply all of the above staple fibers and textile materials. Since PP is most widely used polymer for melt blowing, the term MB will imply MB PP in the description of this invention, although other types of MB fibers may be used, as described herein.

THEORETICAL CONSIDERATIONS

It may be helpful to consider the following:

The FE($\eta$) of a fibrous web from single fiber efficiency theory is expressed by the following equation (Liu, 1986)

$$\eta = 1 - e^{-\eta_s S_f} \tag{1}$$

where
  $S_f$=the filter area factor
  $\eta_s$=single fiber efficiency
and $$S_f = D_f l_f \tag{2}$$

where
  $l_f$=specific length or the length of the fiber per unit filter area
  $D_f$=fiber diameter.

The filter area factor with staple filter blending is increased by $$S_b = D_b l_b \tag{3}$$

where
  lb=specific length of the embedded fibers
  Db=the embedded fiber size.

Therefore, the overall filtration efficiency with the blending of staple fibers becomes $$\eta = 1 - e^{-\eta_0 (S_f + S_b)} \tag{4}$$

where
  $\eta_0$=single fiber efficiency after fiber blending.

The overall single fiber efficiency ($\eta_0$) after fiber blending will be reduced due to the reduction of packing density and the existence of the coarse staple fibers. The overall filtration efficiency may increase or decrease depending on the decreased amount of single fiber efficiency and the increased amount of the filter area factor.

According to Davies (1973), if the air is laminar through the web, the pressure drop of the web is linearly proportional to the function of the web packing density and inversely proportional to the square of the average fiber diameter, i.e., $$\Delta p = \frac{t v \mu f}{d_f^2} (\alpha) \tag{5}$$

where
  $\Delta p$=pressure drop access the web
  t=web thickness
  v=face velocity
  $\mu$=air viscosity
  $d_f$=average fiber diameter
  $\alpha$=packing density.

For a packing density in the range between 0.006 to 0.3, the packing density function was experimentally determined as $$f(\alpha) = 64\alpha^{1.5}(1 + 56\alpha^3) \tag{6}$$

That means that the packing density function is decreased at a faster rate than the decrease of packing density. Together with the increase of the average fiber diameter, the pressure drop decreases by blending the MB web with the coarse staple fibers.

For other parameters being equal, the pressure drop through the web is linearly proportional to the increase of the web thickness. And the web thickness is proportional to the filter area factor. Therefore, the web filtration efficiency can be expressed in terms of the pressure drop across the web, i.e., $$\eta = 1 - e^{-q_f \Delta p} \qquad (7)$$

where $q_f$, called filter quality, is a function of the web and aerosol properties (Hinds, 1982).

Service life is defined as the FE and the pressure drop should not exceed prespecified values. In some aerosols such as sodium chloride particles, the FE increases with the particle loading. Therefore the pressure drop determines the filter service life. The web pressure drop increases as the consequence of particle loading. The filter particle loading capacity is the maximum amount of dust that the filter can hold before the pressure drop exceeds a prespecified value. It is important to relate service life to both pressure drop and loading capacity. When the pressure drop and particle loading relationship curve is obtained, service life can be calculated from the loading capacity of a filter, i.e., $$\tau = \frac{M}{\eta C Q} \qquad (8)$$

where $\tau$ = service life (hours)
M = loading capacity (g/m$^2$)
$\eta$ = filtration efficiency (%/100)
C = aerosol concentration (g/m$^3$)
Q = aerosol flow rate (m$^3$/hour-m$^2$)

Figure 6:
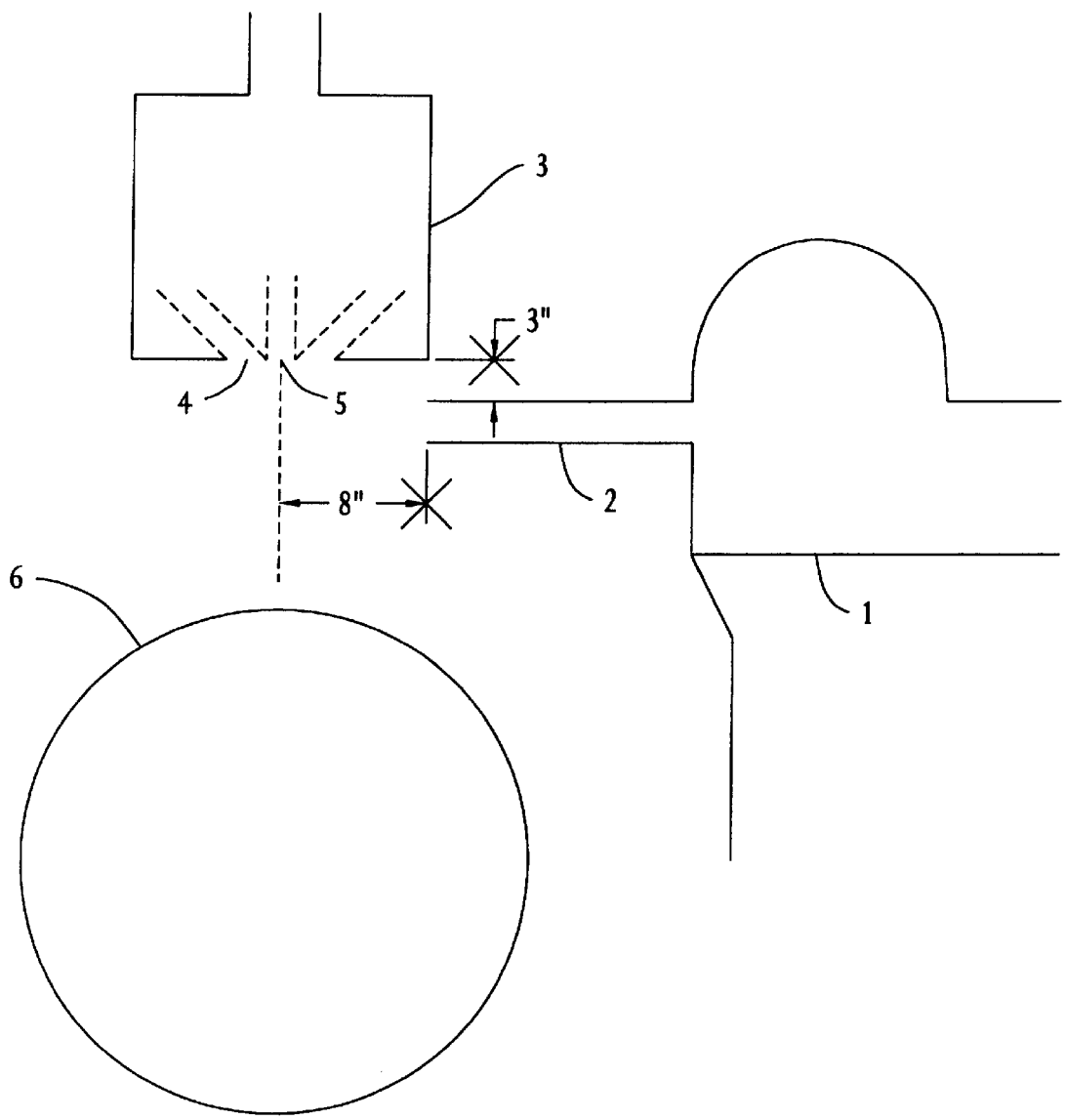
FIG. 6 is a schematic diagram of a preferred embodiment of an apparatus suitable for producing the novel composite according to the present invention.

As shown in FIG. 6, the invention combines meltblowing 1, injecting 2 other fibers into the side of the MB air jet containing the MB fibers 3. The MB fibers and the other staple fibers are violently mixed up and intermingled in the jet and are impacted onto the end of the web being formed. The degree to which the injected staple fibers are concentrated on one side of the web depends on both the vertical and horizontal distance of the exit nozzle of the fiber feed unit as measured from the MB spinneret holes of the exit of the MB die. Thus the density gradient of the composite can be controlled by moving the position of the staple fiber feed unit exit nozzle toward and away from the meltblowing die face, and toward the away from the centerline of the spinneret holes. The density additionally can be controlled by varying the amount of staple fiber injected relative to the amount of the meltblown fiber stream. Generally, the MB fibers which are positioned closest to the exit of the nozzle will have the highest proportion of the stable fibers, while that further remote will have less stable fibers. Likewise, the proportion of the stable fiber in the composite will be increased by increasing the velocity of the stable fiber stream with or without increasing the amount of fiber fed into the MB stream of fibers.

Figure 7:
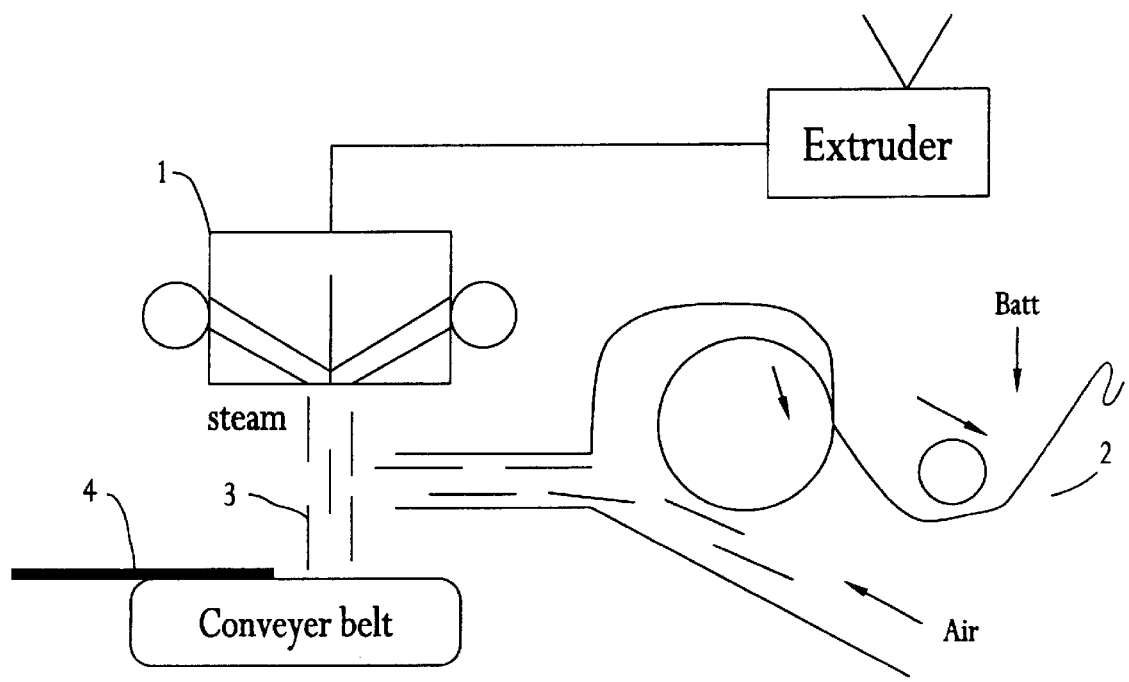
FIG. 7 is a schematic diagram of another preferred embodiment of an apparatus suitable for producing the novel composite according to the present invention.

A typical setting, FIG. 7, is with the Fiber Feed Unit 1 exit nozzle 2 at a vertical distance of 3 inches down from the exit end of the row of MB spinneret holes 5 (typically 20–35 holes per inch of die within one straight row of holes across the die width) and a horizontal distance of 8 attenuates the extruded MB filaments, is delivered through the air knife slots 4 located inside the die on each side of the nosepiece. For reference the fiber collector and web conveyor 6 is shown. Either a rotary screened cylinder or a screen covered conveyor belt (usually with air suction beneath the surface of the cylinder or conveyor belt to aid in the collection of the MB fibers to form the web and to remove the hot air is utilized). As shown in FIG. 6, the composite web 4 is carried off by a conveyor belt and the composite web can be electrostatically charged in the space between the conveyor belt and the winder, which rolls up the composite web. Although not shown in these sketches, the angle at which the Fiber Injection Unit delivers staple fibers to the MB fiber stream may be changed from a 90 degree angle as shown by tilting the unit downward from the die to deliver the fibers to a more tangential position like 10 degree, or less, if desired.

The following example is merely illustrative and is not intended to be a limitation on the invention.

EXAMPLE

The J & M Laboratories, Inc., Dawsonville, Ga., 50 cm vertically oriented MB line at The University of Tennessee was used for making the webs and blending the staple fibers. The fiber blending was conducted using a Fiber Injection System described. A thick (approximately 4 cm thick with a basis weight of 460 g/m$^2$) mat of polypropylene (PP) stable fibers with a width of 20 inches was fed into the Fiber Injection System, which used a combination of rotating cylinders with metal wire teeth and air movement to insert individualized fibers or small twisted strands of fibers into the semi-molten melt blowing fiber/air attenuation stream at a distance of approximately 4 cm from the MB die tip exit. Cotton fibers were also blended in this manner with MB PP fibers to form the low density composite webs. The blending ratio and basis weight of the webs are listed in Table I. The corona-charging of webs to improve their FE values was performed according to Technique II of the Tantret™ electrostatic charging technology developed by Tsai and Wadsworth (1995a), U.S. Pat. No. 5,401,446 which is herein incorporated by reference.

The FE was tested using TSI 8110 Automated Filter Tester and a modified ASTM F1215 (Davis, 1993). Sodium chloride having a number average size of 0.1 $\mu$m was used as challenging particles for TSI 8110. The aerosol had a concentration of 15 mg/m$^3$ at a face velocity of 5.3 cm/s. Polystyrene microspheres having nominal sizes of 0.6, 1.2, and 3 $\mu$m were used for a modified ASTM F1215 test. The actual size of the spheres was 0.62, 1.07, 2.04, and 2.93 $\mu$m at the filtration velocity of 30 cm/s.

Results and Discussion

Figure 1B:
FIG. 1B is an SEM photograph of a melt blown web of FIG. 1A in which polypropylene fiber has been embedded.

The micrographs from scanning electron microscope show in FIGS. 1A and 1B illustrate that the MB fibers are separated by the coarse staple fibers to make porous composite while the unblended MB fibers are packed closely together. The physical properties of the unblended and blended MB fabrics are described in Table I. The carded PP mat, Sample 8, Table I and II, is composed of staple fibers used to embed into the MB fiber stream. The webs blended with PP stable fibers had a higher FE than those unblended for both charged and uncharged webs as shown in Table II with the exception of the uncharged Sample 2, a possible variation of web uniformity. The embedding of cotton fibers into the MB webs showed the same trend as shown in the same table. The pressure drop decreased from 1.9 mm H$_2$O for the 34 g/m² web without blending, Sample 1, Table II, to 1.4 mm H₂O with the blending of PP stable fibers, Samples 1 and 2, Table II. The reduction of pressure drop from the addition of staple fibers was attributed to the increase of pore size or the decrease of packing density. The decrease of packing reduces the FE by single fiber efficiency theory (Davies, 1973). The FE is an exponential function of the multiplication of filter area factor and single fiber efficiency. The slightly changed FE, Samples 2 and 3 compared with Sample 1 in Table II, after blending means that the filter area factor was increased the same amount as the decrease of single fiber efficiency. The pressure drop was not reduced by embedding 80% of the PP staple fibers into the 20 g/m² web as shown in Sample 5, Table II and on the 34 g/m² webs embedded by 17% and 40% of cotton fibers as shown by Samples 6 and 7 in the same table. A low basis weight of MB web, e.g. 20 g/m², was not suitable for embedding with a high percentage of PP stable fibers for the reason that the high increase value of pressure drop did not compensate with the increase of FE. This is compared from their filter quality values. Cotton had a higher ability to entangle with the P MB fibers because they have a fine fiber tail and are twisted like ribbons due to the convoluted structure.

Webs having the same FE with lower pressure drop have a better filter quality. All MB webs blended with staple fibers increased their filter quality as shown in Table II. However, blending with cotton fibers showed a smaller increase in filter quality. Sample 8, Tables I and II, was the PP staple fiber mat used to be blended into MB fiber stream. It was listed to show that its FE was low compared with the MB webs.

More caking occurs with filter media having a small pore size compared to large particle sizes. If the aerosol had a broad particle size distribution, small particles would fill the pores in the cake and hence both FE and pressure drop would increase. This fact is shown in FIGS. 2, 3, 4, and 5 by the unblended web (MB1) of Fe and pressure drop, where NaCl had a number average diameter of 0.1 $\mu$m and standard deviation of 1.9. And the cubic shape of the NaCl challenging particles is also a factor of caking formation.

Figure 2:
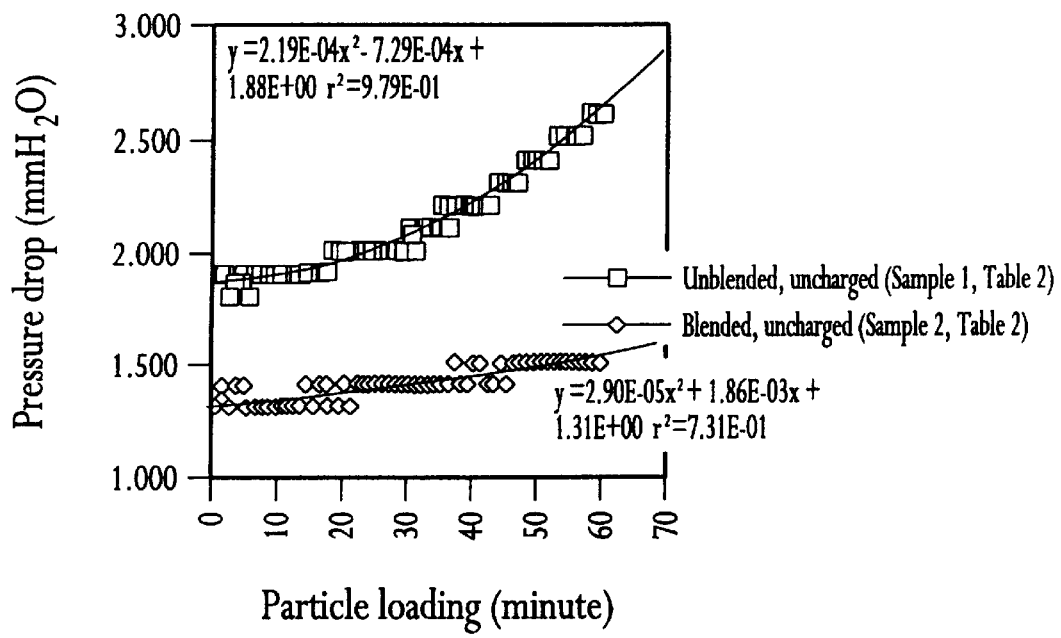
FIG. 2 is a plot of pressure drop vs. particle loading of uncharged Samples 1 and 2 of Table II.
Figure 3:
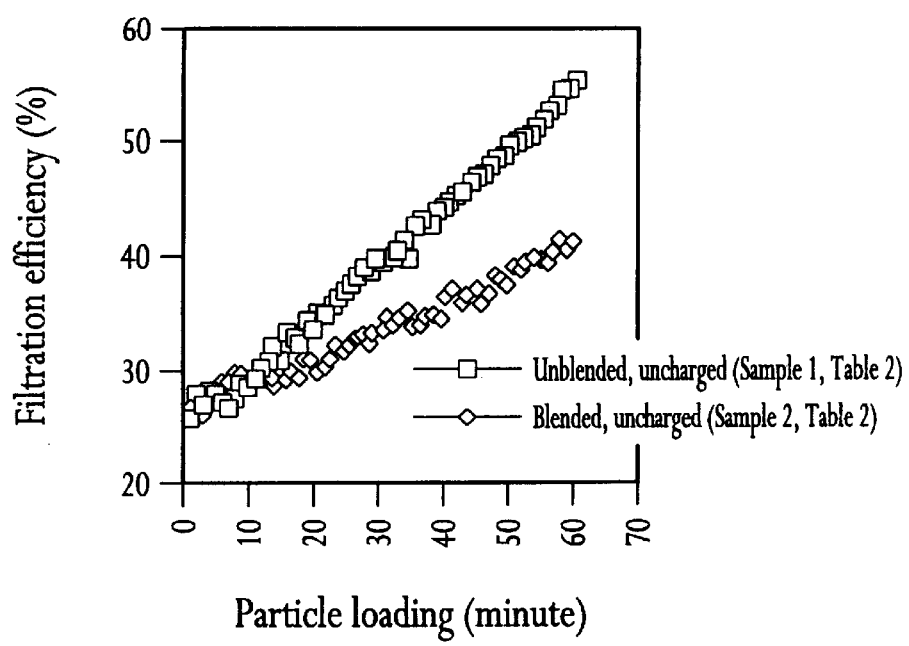
FIG. 3 is a plot of filtration efficiency vs. particle loading of uncharged Samples 1 and 2 of Table II.
Figure 4:
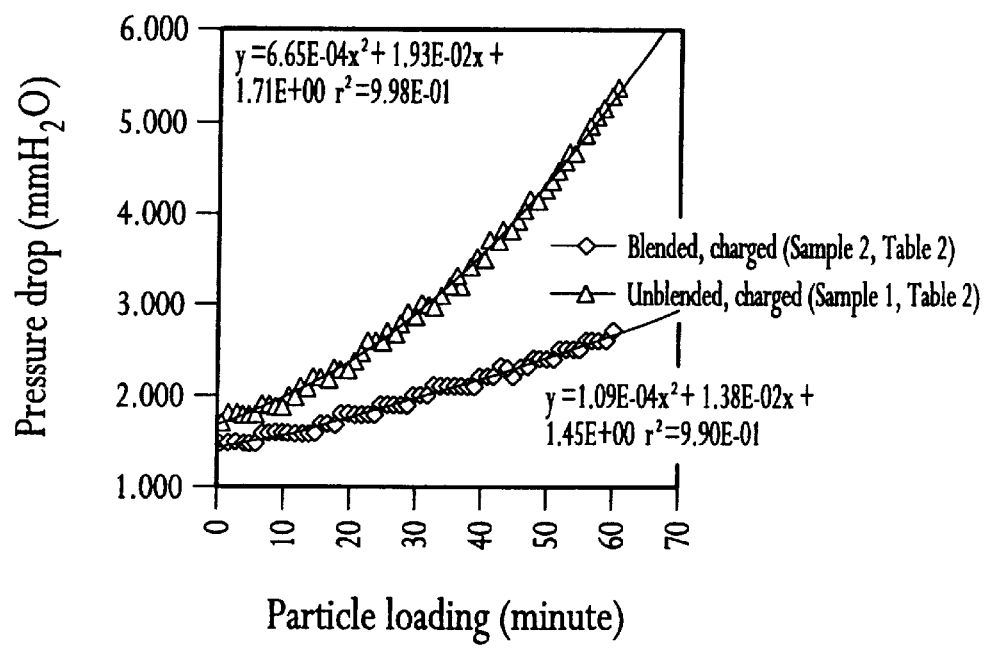
FIG. 4 is a plot of pressure drop vs. particle loading of charged Samples 1 and 2 of Table II.
Figure 5:
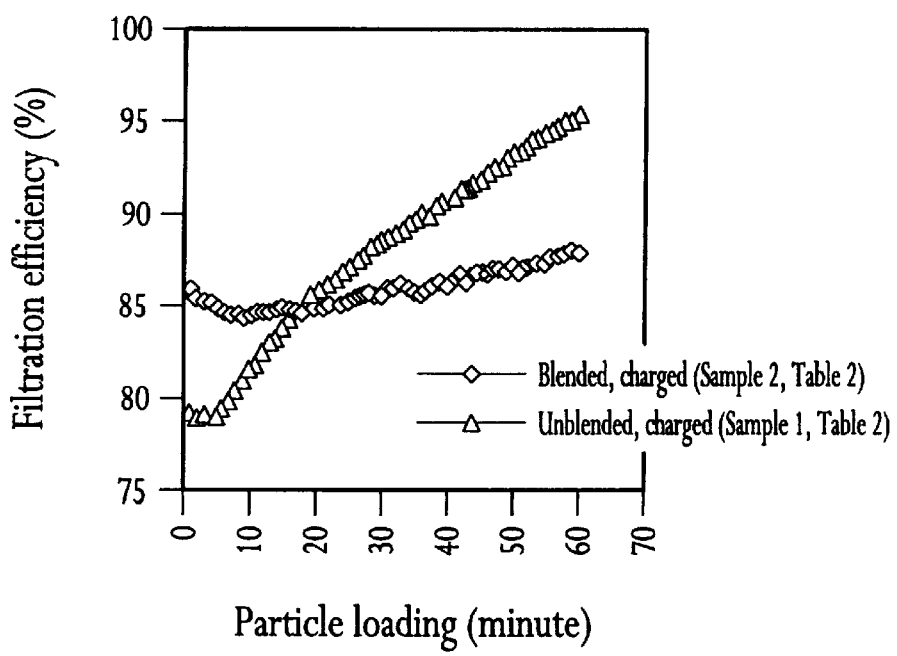
FIG. 5 is a plot of filtration efficiency vs. particle loading of charged Samples 1 and 2 of Table II.

Particles penetrate into the web depth if their sizes are small compared with the web pore sizes. The particles are collected on the fiber surface and form dendrites by the accumulation of particles upon themselves. This accumulation increases the FE by the increase of the surface area in the filter medium as shown in FIGS. 3 and 5 for the blended web. However, this kind of loading increased pressure drop at a much slower rate than did caking on unblended web as shown in FIGS. 2 and 4.

Service life of the blended webs was increased due to their slower increasing rate of the pressure drop across the web. Service life can be obtained from the curve that relates pressure drop to service time as shown in FIGS. 2 and 4. If the specified pressure drop was, for example 3 mmH₂O, the service life for uncharged, unblended web was 73 minutes, for uncharged, blended it was 211 minutes, for charged unblended it was 32 minutes, and for charged, blended it was 72 minutes by the curve-fitting formula.

The charged webs had a decrease in FE in the initial filtration process as shown in FIG. 5 for both blended and unblended webs. The FE decreased with the particle loading because the charges were neutralized by the particles in the very beginning of filtration and the filtration by electrostatic mechanisms was reduced. After loading, the FE increased because the mechanical mechanisms overrode the electrostatic mechanisms. This is a typical loading effect on a electrostatically charged filter that has been well documented (Hinds, 1982). The reduction of electrostatic filtration with the NaCl loading was by the image neutralization of the charges with the NaCl particles rather than by the dissipation of charges. It has been shown (Tsai, 1993) that PP material has little charge dissipation with the storage time. Therefore, the charged PP fabrics have a good shelf life.

It has been shown that the air flow through MB webs is laminar for a large range of web basis weights and filtration velocities (Tsai, 1993). When the webs were challenged with polystyrene spheres at the face velocity of 30 cm/s, the pressure drops in Tables III and IV show that Equation 5 was obeyed. The samples in these two tables are the samples in Table II with corresponding sample numbers. The pressure drop of each web was the same when the pressure drop at the velocity of 30 cm/s was normalized to the velocity of 5.3 cm/s.

It is known (Hinds, 1982) that FE increases with the increase of particle size from the point of mechanical filtration mechanisms when the particle size is greater than the most penetrating size, say 0.1–0.3 $\mu$m depending on the fiber size and the filtration velocity, etc. This effect is illustrated in Table IV for the uncharged webs. The same was true for the charged webs as shown in Table III. However, the increase of the $F^e$ for the charged web with the particle size was not as noticeable as that of the uncharged webs. The electrostatic mechanisms do not have powerful attraction on large particle size moving at high velocity (Brown, 1993). There is no theory to predict the relationship between the FE and the particle size for charged webs because of the difficulty to characterize the charges in the web after electrostatic charging. The electrostatic force has a great contribution in filter efficiency for small particles at a low filtration velocity. This fact is described in Tables III and IV.

Finally, the blending of 110% PP staple fibers with the 34 g/m² MB web, Sample 3, Table II, did not result in better FE and lower pressure drop than the blending with 50% PP staple fibers. The blending with the basis weight of 20 g/m² MB web, Sample 4, did not reduce the pressure drop but the FE was increased. Blending with cotton fibers resulted in higher FE and pressure drop than did corresponding blend ratios with PP staple fibers. Although PP has a high dielectric barrier, this lot of PP staple fibers could not be corona-charged, apparently because of the antistatic agent in the spin finish (Tsai, 1996). In some cases, these researchers have found that heating the staple PP fibers and/or washing and drying them minimizes the ability of the spin finish to interfere with effective electrostatic charging of the fibers. Cotton has a high moisture regain which readily conducts charges away from the fibers where they are neutralized by the ions present naturally in the air. Nevertheless, when both PP staple fibers and cotton were blended with PP MB webs, the resultant composite fabrics were easily electrostatically charged using the charging technology developed by Tsai and Wadsworth (1995a).

Conclusion

The fabric composites made by the injection of coarse staple fibers into the MB fiber stream reduced the pressure drop of the aerosol flowing through the fabrics without decreasing the fabric FE. The amount of the pressure drop reduction and the increase of the FE depended on the MB basis weight and the percentage of the staple fibers being embedded, and the structural properties of the staple fibers as well. The blended composites were able to be electrostatically charged by the techniques developed at the University of Tennessee to an optimal FE.

The following references pertaining to the background of the invention disclosed herein are hereby integrated by reference in their entirety.

TABLE I

Physical properties of the webs.

| Sample # | Sample | Substrate B. Wt. (g/m²) | Blending % | Weight (g/m²) | Total Weight (g/m²) |
|---|---|---|---|---|---|
| 1 | MB1 | 34 | 0 | 0 | 34 |
| 2 | MB1 + PP | 34 | 50 | 17 | 51 |
| 3 | MB1 + PP | 34 | 110 | 37.4 | 71.4 |
| 4 | MB2 | 20 | 0 | 0 | 20 |
| 5 | MB2 + PP | 20 | 80 | 16 | 36 |
| 6 | MB1 + Cotton | 34 | 17 | 5.8 | 39.8 |
| 7 | MB1 + Cotton | 34 | 40 | 13.6 | 47.6 |
| 8 | Carded PP Mat | 464 | 0 | 0 | 464 |

TABLE II

NaCl filtration efficiency and filter quality

Filtration efficiency, pressure drop and filter quality

| | Uncharged | | | Charged | | |
|---|---|---|---|---|---|---|
| Sample | Filt. Eff. (%) | Δp (mm H₂O) | Qf (l/mm H₂O) | Filt. Eff. (%) | Δp (mm H₂O) | Qf (l/mm H₂O) |
| MB1 | 28.6 | 1.9 | 0.177 | 91.1 | 1.9 | 1.273 |
| MB1 + PP | 27 | 1.4 | 0.225 | 94.5 | 1.5 | 1.934 |
| MB1 + PP | 30.4 | 1.6 | 0.228 | 93.2 | 1.5 | 1.792 |
| MB2 | 15.5 | 1.1 | 0.153 | 72.7 | 1.1 | 1.180 |
| MB2 + PP | 21.8 | 1.1 | 0.224 | 84.1 | 1.1 | 1.672 |
| MB1 + Cotton | 37.9 | 2.3 | 0.207 | 97.7 | 2.5 | 1.510 |
| MB1 + Cotton | 36.2 | 2.3 | 0.195 | 98.0 | 2.3 | 1.701 |
| Carded PP Mat | 12.7 | 0.7 | 0.194 | 13.0 | 0.7 | 0.199 |

TABLE III

Filtration efficiency of charged webs on polystyrene spheres

| | Filtration efficiency of polystyrene sphere (5) | | | | Pressure drop (mm H₂O) | |
|---|---|---|---|---|---|---|
| Sample | 0.6 μm | 1.0 μm | 2.0 μm | 3.0 μm | 30 cm/s | 5.3 cm/s |
| 1 | 74.5 | 77.4 | 91.7 | 95.4 | 9.65 | 1.71 |
| 2 | 80.6 | 81.8 | 92.5 | 96.1 | 9.65 | 1.71 |
| 3 | 88.0 | 88.9 | 96.3 | 99.3 | 8.39 | 1.49 |
| 5 | 67.2 | 68.1 | 81.3 | 91.9 | 6.10 | 1.08 |
| 6 | 88.3 | 90.3 | 98.6 | 99.7 | 12.19 | 2.15 |
| 7 | 84.7 | 87.2 | 97.6 | 99.4 | 11.18 | 1.97 |

TABLE IV

Filtration efficiency of uncharged webs on polystyrene spheres

| | Filtration efficiency of polystyrene sphere (5) | | | | Pressure drop (mm H₂O) | |
|---|---|---|---|---|---|---|
| Sample | 0.6 μm | 1.0 μm | 2.0 μm | 3.0 μm | 30 cm/s | 5.3 cm/s |
| 1 | 30.5 | 46.0 | 88.1 | 95.5 | 9.65 | 1.71 |
| 2 | 31.3 | 44.6 | 76.1 | 96.7 | 8.13 | 1.44 |
| 3 | 33.4 | 45.7 | 85.9 | 97.2 | 8.51 | 1.50 |
| 5 | 28.6 | 40.4 | 79.1 | 92.8 | 6.10 | 1.08 |
| 6 | 39.8 | 56.4 | 93.8 | 98.8 | 10.54 | 1.86 |
| 7 | 45.9 | 59.6 | 94.6 | 99.2 | 10.67 | 1.88 |

TABLE V

Physical properties of MB PP-based webs with PP staple fiber addition at Accurate Products Laboratory.

| Sample # | Sample | Substrate B. Wt. (g/m²) | Blending % | Weight (g/m²) | Total Weight (g/cm²) |
|---|---|---|---|---|---|
| 9 | MB3 | 18 | 0 | 0 | 18 |
| 10 | MB3 + PP | 18 | 210 | 38 | 56 |

TABLE VI

NaCl filtration efficiency and filter quality of MB PP-based webs with PET staple fiber addition at Accurate Products Laboratory

| | Filtration efficiency, pressure drop and filter quality | | | | | |
|---|---|---|---|---|---|---|
| | Uncharged | | | Charged | | |
| Sample | Filt. Eff. (%) | Δp (mm H$_2$O) | Qf (1/mm H$_2$O) | Filt. Eff. (%) | Δp (mm H$_2$O) | Qf (1/mm H$_2$O) |
| MB3 | N/A | N/A | N/A | N/A | N/A | N/A |
| MB3 + PP | 27.3 | 1.2 | 0.266 | 79.8 | 1.2 | 1.333 |

References

U.S. Pat. No. 4,100,324 (Anderson et al.)
U.S. Pat. No. 4,118,531 (Hauser)
Assoc. Of the Nonwoven Fabrics Industry, "The Nonwovens Handbook", pp. 53–55.
Brown, R. C., (1970), *Air Filtration,* Pergamon Press.
Davies, C. N., (1973), Air Filtration, Academic Press.
Davis, W. T., (1993), "Air Filtration Efficiency Testing Using ASTM F1215," Proceedings, TAPPI Nonwovens Conference.
Hassenboehler, C. B. and Wadsworth, L. C., (1994), "Melt Blown Webs Products for Filtration," *Fluid/Particle Separation Journal,* 7(1), 31M–32M.
Hinds, W. C., (1982), *Aerosol Technology,* John Wiley & Sons.
Tsai, P. P., and Wadsworth, L. C., (1993), "Measurement of Melt Blown Geometric Properties by Air Flow Techniques," Book of Papers, 3$^{rd}$ TANDEC Conference, The University of Tennessee.
Tsai, P. P., and Wadsworth, L. C., (1994a), "Air Filtration Improved by Electrostatically Charging Fibrous Materials," *Particulate Science and Technology, An International Journal,* 12(4), 323–332.
Tsai, P. P., and Wadsworth, L. C., (1994b), "Effect of Aerosol Properties on the Filtration Efficiency of Melt Blown Webs and their Electrets," Book of Papers, 4$^{th}$ TANDEC Conference, The University of Tennessee.
Tsai, P. P., and Wadsworth, L. C., (1995a), "Method and Apparatus for the Electrostatic Charging of a Web or Film," U.S. Pat. No. 5,401,446.
Tsai, P. P., and Wadsworth, L. C., (1995b), "Effect of Polymers and Additives on the Electrostatic Charging of Different Filter Structures," 5$^{th}$ TANDEC Conference.
Wadsworth, L. C., and Lee, L. (1990), "Relationship Among Melt Blown Web Structure, Air Permeability and Filtration Efficiency," *INDA Journal of Nonwovens Research,* 2(1), 43–48.
Liu, B. Y. H. and Rubow, K. L. (1986), "Air Filtration by Fibrous Media," ASTM STP 975, 1.

What is claimed is:

1. A porous composite having an inlet face and an exit face, which composite comprises intermingled melt blow fibers and staple fibers, wherein the intermingled melt blown and staple fibers define a density gradient from coarse pores at the inlet face to fine pours at the exit face, and wherein said staple fibers comprise particles of material selected from activated carbon and superabsorbant power.

2. The composite of claim 1 wherein the density gradient is defined by a variation across the composite from the inlet face to the exit face of the blend ratio of staple fibers to melt blown fibers.

3. The composite of claim 2 wherein the blend ratio of staple fibers to melt blown fibers is in the range of about 0.17 to about 1.10 on a weight basis.

4. The composite of claim 2 wherein the staple fibers comprise textile shreds of maximum dimension in the range from about 1/16–1/2 inch.

5. The composite of claim 1 wherein the staple fibers comprise fibers having a diameter of about 12–60 micrometers and length of about 0.5–6 inches.

6. The composite of claim 1 wherein the meltblowable fibers are polyolefin fibers.

7. The composite of claim 1 wherein the melt blown fibers comprise a polyolefin and the staple fibers comprise cotton.

8. The composite of claim 7 wherein the polyolefin is polypropylene.

9. The composite of claim 1 wherein the composite has an electrostatic charge.

10. A porous "used" composite having an inlet face and an exit face, which composite comprises intermingled melt blown fibers and staple fibers, which has increased filtration efficiency (FE), wherein the intermingled melt blown and staple fibers define a density gradient from coarse pores at the inlet face to fine pores at the exit face, wherein the composite comprises particles captured on the fibers, the larger particles being positioned in the area of the composite which has larger pores, and the smaller particle being positioned in area of the composite which has the smaller pores, thereby forming a gradient of captured particle from one face of the composite to the other.

11. The used composite of claim 10 wherein the melt blown fibers are electrostatically charged.

12. A porous composite comprising:
   a. an inlet face;
   b. an exit face; and
   c. intermingled melt blown fibers and staple fibers, wherein said melt blown fibers are electrostatically charged, and wherein said melt blown fibers and said staples fibers define a density gradient from coarse pores at the inlet face to fine pores at the exit face.

13. The composite of claim 12, wherein said composite comprises a blend ratio of staple fibers to melt blown fibers within a range of 17/100 to 11/10.

* * * * *